(12) United States Patent
Tarbox et al.

(10) Patent No.: US 7,120,600 B2
(45) Date of Patent: Oct. 10, 2006

(54) SYSTEMS AND METHODS FOR IMPROVING INVESTMENT PERFORMANCE

(76) Inventors: Brian C. Tarbox, 5535 Bristol La., Minnetonka, MN (US) 55343; Mark Greenstein, 7812 Massena Rd., Bethesda, MD (US) 20817

( * ) Notice: Subject to any disclaimer, the term of this patent is extended or adjusted under 35 U.S.C. 154(b) by 240 days.

(21) Appl. No.: 10/073,632

(22) Filed: Feb. 11, 2002

(65) Prior Publication Data

US 2002/0169701 A1    Nov. 14, 2002

Related U.S. Application Data

(60) Provisional application No. 60/349,162, filed on Jan. 16, 2002, provisional application No. 60/349,459, filed on Jan. 18, 2002, provisional application No. 60/267,771, filed on Feb. 9, 2001.

(51) Int. Cl.
     *G06Q 40/00* (2006.01)
(52) U.S. Cl. .................. 705/36 R; 705/35; 705/36
(58) Field of Classification Search ............ 705/34–36, 705/38, 39, 36 R
     See application file for complete search history.

(56) References Cited

U.S. PATENT DOCUMENTS

| | | | | |
|---|---|---|---|---|
| 5,126,936 A | * | 6/1992 | Champion et al. | 705/36 |
| 5,132,899 A | * | 7/1992 | Fox | 705/36 |
| 5,590,037 A | * | 12/1996 | Ryan et al. | 705/4 |
| 5,689,649 A | * | 11/1997 | Altman et al. | 705/36 |
| 5,774,881 A | | 6/1998 | Friend et al. | 705/36 |
| 5,812,987 A | | 9/1998 | Luskin et al. | 705/36 |
| 5,999,917 A | | 12/1999 | Facciani et al. | 705/36 |
| 6,012,043 A | * | 1/2000 | Albright et al. | 705/36 |
| 6,018,722 A | | 1/2000 | Ray et al. | 705/36 |
| 6,055,517 A | | 4/2000 | Friend et al. | 705/36 |
| 6,078,904 A | | 6/2000 | Rebane | 705/36 |
| 6,154,732 A | | 11/2000 | Tarbox | 705/36 |
| 6,240,399 B1 | | 5/2001 | Frank et al. | 705/36 |
| 6,278,981 B1 | * | 8/2001 | Dembo et al. | 705/36 |
| 6,411,939 B1 | * | 6/2002 | Parsons | 705/35 |

(Continued)

FOREIGN PATENT DOCUMENTS

EP    0572281    * 5/1993

OTHER PUBLICATIONS

Business Week Online: Your Money; First, Asset, Allocation. Now, "Asset Placement"; Http://www.businessweek.com/bwdaily/dnflash/august/nf70814a.htm; Aug. 14, 1997; pp. 1 and 2.*

(Continued)

*Primary Examiner*—Ella Colbert
(74) *Attorney, Agent, or Firm*—R. Thomas Payne; Katten Muchin Rosenman LLP

(57) ABSTRACT

Systems and methods for a data processor implemented system monitor for enabling persons to turn over the allocation their investment assets, and/or receive assistance concerning how to receive disbursements from investments, in a manner that is free from or ameliorates the traditional conflicts of interest in previous systems. The systems and methods are adapted to ameliorate the tension between other functions where the compensation may be affected by asset allocation. The systems and methods collect, monitor, and direct information from persons who hold indicative data (e.g., employers), to provide professional asset allocation services including automatic allocation, rebalancing, and reallocation of investment assets, on a regular basis; as well as assistance in determining how much to save or how to receive disbursements in a manner that ameliorates conflicts of interest, which, in the case of employee benefit plans, is consistent with the regulatory restraints of ERISA.

18 Claims, 5 Drawing Sheets

U.S. PATENT DOCUMENTS

| | | | |
|---|---|---|---|
| 2002/0013751 A1 | 1/2002 | Facciani et al. | 705/36 |
| 2002/0013754 A1 | 1/2002 | Frank et al. | 705/36 |
| 2002/0038271 A1 | 3/2002 | Friend et al. | 705/36 |
| 2002/0062272 A1 | 5/2002 | Kim et al. | 705/36 |
| 2002/0091605 A1 | 7/2002 | Labe, Jr. et al. | 705/36 |
| 2002/0103733 A1 | 8/2002 | Barrington et al. | 705/35 |
| 2002/0138383 A1 | 9/2002 | Rhee | 705/36 |
| 2002/0152151 A1 | 10/2002 | Baughman et al. | 705/36 |
| 2002/0174045 A1 | 11/2002 | Arena et al. | 705/36 |
| 2005/0154658 A1* | 7/2005 | Bove et al. | 705/35 |

OTHER PUBLICATIONS

Roger G. Ibbotson, et al., Does Asset Allocation Policy Explain 40, 90, or 100 Percent of Performance, Financial Analysts Journal, Jan./Feb. 2000, pp. 26-33.

Emily S. Andrews, "The Growth and Distribution of 401(k) Plans" chapter 8 from Trends In Pensions 1992: U.S. Department of Labor; Pension and Welfare Benefits Administration, 1992, pp. 149-176.

Jayne Zanglein, "Investment Without Education: The Disperate Inpact on Women and Minorities In self-Directed Defined Contribution Plans", Employee Rights and Employment Policy Journal, vol. 5, No. 1, 2001, pp. 223-272.

Roni Michaely and Kent Womack, "Conflict of Interest and the Credibility of Underwriter Analyst Recommendations", Feb. 1999.

James M. Poterba, et al., 401(k) Plans and Tax-Deferred Saving, Studies in the Economics of Aging, 1994, pp. 105-142.

Jennifere Frighetto, "Automatically Enrolling Employees in 401(k) Plan Not A Cure All" [online], Hewitt press release, Jul. 17, 2000 [retrieved on Mar. 21, 2004], <URL address http:www.hewittasia.com/hewitt/ap/resource/newsroom/pressrel/2000/07-17.html>.

Brigitte Madrian and Dennis Shea, "The Power of Suggestion: Inertia in 401(k) Participation and Savings Behavior", Apr. 17, 2000.

William F. Bassett, Michael J. Fleming and Anthony P. Rodrigues, "How Workers Use 401(k) Plans: The Participation, Contribution, and Withdrawal Decisions," National Tax Journal 51, No. 2 (Jun. 1998): 263-89.

"Building Futures: vol. II: A Report on Corporate Defined Contribution Plans" Fidelity Investments Institutional Services, Inc., 1999.

Olivia S. Mitchell and James F. Moore, "Can Americans Afford to Retire? New Evidence on Retirement Saving Adequacy", The Journal of Risk and Insurance, 1998, vol. 65, No. 3, pp. 371-400.

The New York Times, published Apr. 12, 2005, Tax Policy Center/News & Events.

Save More Tomorrow™ Using Behavioral Econom cs to Increase Employee Saving, Richard H. Tnater and Shlomo Benartzi, Jul. 2003.

The Wagner Law Group, Professional Corporation, Tax Management Compensation Planning Journal, Managed Accounts Are They The Answer?. by Marsha S. Wagner.

John Turner, "Private Accounts In Chile", Fact Sheet FS 110, AAPR Public Policy Institute, Mar. 2005.

* cited by examiner

US 7,120,600 B2

SYSTEMS AND METHODS FOR IMPROVING INVESTMENT PERFORMANCE

RELATED APPLICATIONS

This application claims priority benefit of: U.S. Provisional Patent Application Ser. No. 60/349,162, filed Jan. 16, 2002, of Tarbox et al., entitled "IMPROVED SYSTEM FOR ALLOCATING PENSION ASSETS WITH OR WITHOUT AN AFFIRMATIVE ELECTION," U.S. Provisional Patent Application Ser. No. 60/349,459, filed Jan. 18, 2002, of Tarbox et al., entitled "SYSTEM FOR ALLOCATING PENSION ASSETS WITH OR WITHOUT AN AFFIRMATIVE ELECTION," and U.S. Provisional Patent Application Ser. No. 60/267,771 filed Feb. 9, 2001, of Tarbox, entitled "SYSTEM FOR ALLOCATING PENSION ASSETS WITH OR WITHOUT AN AFFIRMATIVE ELECTION," and is related to U.S. Pat. No. 6,154,732, issued Nov. 28, 2000, of Tarbox. The disclosure of each of the above is herein incorporated by reference to the extent not inconsistent with the present disclosure.

BACKGROUND OF THE DISCLOSURE

The present disclosure relates generally to an innovative investment program, which is designed to improve investment performance for investors, including participants in Benefit Plans, by automatically determining appropriate savings levels and automatically allocating, rebalancing and reallocating investment assets (which generally include taxable and tax-deferred assets, and may include assets in Benefit Plans, once an investor so directs or in cases where a third party can direct on behalf of the investor, without receiving direction from the investor) for investors, while eliminating or, at least, ameliorating the conflict of interest that would otherwise exist between a provider of automatic allocation services and persons (e.g., money managers, registered investment advisors, etc.) that would normally benefit from such automatic services. The innovative investment program includes, but is not limited to, systems and methods that are computer housed software programs for collecting, monitoring and directing data from persons, who hold investors' indicative data, including, but not limited to, sponsors of pension plans, money managers, and affiliates of such persons.

The field of individual savings, including retirement savings, has been greatly impacted by the vigorous growth of the stock market and retirement plans that offer individual accounts. Both of these recent phenomena generally require the individual investor to both determine how much to save and how to invest savings, including directing the investment of the assets allocated in his or her individual savings account or similar account. Considering the continuing erosion of traditional Benefit Plan pension plans (which are managed on behalf of individuals and, in this regard, require no action from such individuals), the approaching retirement of the baby-boom generation, and the growing interest in Social Security reform, effective savings, including the effective use of the Benefit Plan, as defined hereinafter, is a cornerstone of an effective retirement policy for the United States of America, or any other country facing the above challenges, and is believed will have a staggering impact on future national and state policy as well as future national and state budget allocation decisions.

In the case of Employee Benefit Plans ("Benefit Plans" are arrangements, including trusts or other vehicles associated with such arrangements, which hold assets generally designed to be saved until after termination of employment, including, but not limited to, employer-sponsored 401(k) plans, and individual retirement plans and annuities and other similar plans), Benefit Plan sponsors and public policy officials have been very concerned about the effective "utilization" of Benefit Plans and the implications thereof with respect to the future of at least Social Security for some time. Investments in employee education, expanded investment choices, lifestyle funds, retirement planning software, online advice tools, etc. have all been produced with the goal of improving the overall national savings rates, including Benefit Plan utilization (i.e., raising participation rates, generally increasing salary deferral levels and establishing/maintaining appropriate asset allocation).

Unfortunately, the above-described methods are yet to achieve the desired results. Despite investments in the above described methods, most individuals, including many participants in self-directed, individual account plans, do not even participate, and when most individuals do participate, most individuals do not appropriately save and invest, including a failure to participate in 401(k) plans, nor do they save sufficient amounts, as reported in O. S. Mitchell, J. F. Moore, 1998, "Can Americans Afford to Retire? New Evidence on Retirement Saving Adequacy," Journal of Risk & Insurance 65(3), 371–400, and/or most individuals do not appropriately allocate their assets, including assets in their retirement accounts, to adequately provide for their future retirement income needs.

As is known, individual investors as opposed to institutional investor populations can roughly be divided into two groups as follows:

Financially "Involved":

The "financially involved," as defined in the present application, are believed to already be doing better than the average Benefit Plan participant but are generally not yet saving or allocating their saving in an optimal manner. The financially involved presently save in greater (and generally more appropriate) amounts and are believed to generally appreciate additional tools and information and would apparently benefit from these and additional services, though not as to the same extent as the financially uninvolved apparently would benefit.

Financially "Uninvolved":

The "financially uninvolved," as defined in the present application are believed responsible for the bulk of the investment shortcoming problem, as the participation of the financially uninvolved in employer sponsored pension or savings vehicles, (including Benefit Plans savings) and asset allocation behavior is inconsistent with that which would be implemented by a qualified financial professional. The financially uninvolved do not appreciate tools and information and appear to simply want to be handed a solution for retirement investing with the least amount of their personal involvement as possible.

Drastically improving the resulting problems described above (including under utilization of employer sponsored Benefit Plans) requires meeting the needs of the "financially uninvolved," which typically represents well over sixty percent (60%) of the employee population. Recent studies indicate that, in the case of section 401(k) Employee Benefit Plans, the financially uninvolved group's 401(k) participation and investment decisions vary tremendously with the way that the 401(k) participation and investment options are presented to the plan participants. The findings from these studies strongly suggest that current 401(k) Employee Benefit Plans are not optimally designed to meet the needs of the "financially uninvolved" segment of Employee Benefit Plan eligible employees.

Specifically, it is presently believed that the problems described above for both the financially involved and the financially uninvolved result from the fact that currently, individuals are either: 1) too involved in the process of selecting investments and frequently do so by choosing investments based on the recent performance of individual investment vehicles; 2) do not save appropriate amounts to meet their goals, including retirement; or 3) more often, they feel they do not have the time, interest, and/or expertise to make appropriate investments or structure appropriate savings plans.

The above described individual-investor behavior is in contrast to institutional investors, who recognize the importance of appropriately funding for future liabilities, and then determine an appropriate funding policy and asset allocation model to best fund future liabilities, and only then select investment vehicles based on the ability to implement the model allocation-thus recognizing that money management (e.g., security selection) is of secondary importance for passive, long-term investors.

The process described above as used by individuals typically results in inadequate funding levels (low savings rates) and inappropriate investment including suboptimal allocations. Specifically, it is presently believed that the problems described above for both the financially involved and the financially uninvolved result from the fact that, currently, the process of carrying out the necessary steps to appropriately save, as outlined above, is still too overwhelming for even the financially involved, much less the financially uninvolved.

It is presently believed that one of the possible reasons for the inadequate savings situations, as describe above, is that saving for the future is typically something that is put off until tomorrow, especially by financially uninvolved investors and especially, by individual Benefit Plan participants in the absence of effective investment assistance. In the case of Employee Benefit Plans lack of participation by eligible employees, it has been and is presently a persistent problem that Benefit Plan sponsors face with the implementation of Benefit Plans. Benefit Plan sponsors are all too familiar with employees who always intend to enroll in the Benefit Plan, but somehow never quite get around to submitting the authorization that will enable the Benefit Plan sponsor to deduct the contributions (savings) from the employees pay on a regular basis. Various academic studies and consulting reports indicate that somewhere between one-quarter and one-third of 401(k)-eligible employees do not participate in their company-sponsored 401(k) Benefit Plan. (See, for example, Poterba, Venti and Wise (1994), Andrews (1992), and Bassett, Fleming and Rodrigues (1998) for academic studies and Fidelity Investments (1999) for a consulting report.

One of the main reasons given by individual investors for nonparticipation in Benefit Plans for which they are eligible is that the process of optimally making a decision to start any savings plan, including participation in a 401(k) plan is complicated, as viewed by the average potential Benefit Plan participant or eligible participant. Studies by psychologists have shown that increasing the complexity of a decision-making task leads individuals to defer making a decision or to procrastinate and such appears to be prevalent among the average potential Benefit Plan participants.

It is presently believed that there are at least two sources of complexity in starting any savings program, such as, for example, Benefit Plans, including making the initial decision to "opt in" as a plan participant and then making an optimal 401(k) Benefit Plan investment allocation decision. First, the shear number of possible investment allocation options to be evaluated by individual investors is enormous. Each individual investor must first choice what fraction of their compensation or other income to contribute (savings) to the Benefit Plan. With respect to 401(k) Benefit Plans, generally a range of from one percent (1%) to fifteen percent (15%) of an employee's compensation is offered as possible options. Each individual investor must then close how to allocate their contribution (savings). In the case of 401(k) Benefit Plans, there are between, on average, ten or more investment options that are available. Outside a 401(k) Benefit Plan, the investment allocation options are, as a practical matter, unlimited. Even in most 401(k) Benefit Plans there are, quite literally, an infinite number of investment allocation combinations available.

For the "financially uninvolved" employees, a second source of complexity is learning how to evaluate the myriad of 401(k) Benefit Plan investment allocation options that are available. For example, despite significant investments in employee education, studies show year after year that more than fifty percent (50%) of employees do not even know what a "money market fund" is, much less have the knowledge to intelligently choose from among the myriad of 401(k) Benefit Plan investment allocation options that are available.

Thus, individual investors may rationally postpone making a decision on savings, including 401(k) Benefit Plan participation, most likely because the cost in time and effort of gathering the information necessary to make an intelligent choose from among the myriad of 401(k) Benefit Plan investment allocation options that are available may exceed the sort-term benefit from making such a decision, as viewed by large numbers of individual investors.

Recently, some Benefit Plan sponsors have reversed the above described retirement savings procrastination simply by using automatic enrollment in 401(k) Benefit Plans. Under automatic enrollment, individual employees who do not actively request to be excluded from a Benefit Plan are enrolled and a default contribution deferral amount (savings) is automatically deducted from their paycheck (usually 3% of pay) and contributed (saved) to their 401(k) Benefit Plan. The default deferral amount is invested in a default investment vehicle, usually something conservative, such as, for example, a money market or other relatively stable value fund. Individual employees who do not wish to participate in the available 401(k) Benefit Plan must actively submit their election to "opt-out" (rather than to "opt-in") the company sponsored Benefit Plan.

Results to date of such an automatic enrollment policy show that automatic enrollment appears to be a "win-lose" approach to changing 401(k) Benefit Plan savings behavior with the "win" aspect being that automatic enrollment has dramatically increases participation. For example, using automatic enrollment, McDonald's has managed to achieve a ninety five percent (95%) enrollment, an astonishing number for a largely unskilled workforce. Participation in the 401(k) plan at J.C. Penney Co. jumped to eighty nine percent (89%) of its 257,000 employees, from the low seventy percent (low 70%), a year after the retailer launched its automatic enrollment participation policy. Additionally, Hewlett-Packard increased the enrollment of new workers in the company 401(k) plan from under fifty percent (50%) to ninety eight percent (98%) by implementing an automatic enrollment policy.

Moreover, while automatic enrollment appears to substantially increase the overall 401(k)-participation rate, automatic enrollment also has another important effect of equalizing participation rates across various demographic subgroups. The effects are largest among the groups with the lowest participation rates under the previous regime of affirmative elections, particularly blacks and Hispanics, the young, and employees with lower levels of compensation.

As the United State's personal savings rate—savings as a percentage of disposable income—fell to a quarterly low of about three tenths of one percent (0.3%) in the first quarter 2000, the Internal Revenue Service (IRS) issued two rulings (Revenue Rulings 2000-8 & 2000-33) in 2000 approving automatic enrollment for employees already on payrolls and for participants in 403(b) retirement plans for nonprofit and educational workers and for 457 plans for government workers.

Noting that 75 million Americans do not participate in a retirement pension plan and have little or no other retirement savings, Treasury Secretary Lawrence Summers and Labor Secretary Alexis Herman issued a joint statement praising automatic enrollment as a "promising method of encouraging participation by those who disproportionately have been missing the benefits of a regular, disciplined approach to retirement savings. We encourage employers to consider adopting automatic enrollment."

Beyond a genuine desire to help employees save for retirement, companies have pragmatic reasons to offer automatic enrollment to their 401(k) Benefit Plans. Utilizing automatic enrollment has proven to be an effective means for increasing the contribution level for non-highly compensated employees so that these companies' 401(k) Benefit Plans meet discrimination tests and, thereby, allow highly compensated employees to maximize their contributions to the companies' 401(k) Benefit Plans.

However, as is usually the case, there is always a down side. In the situation described above, the "lose" aspect of automatic enrollment being that automatic enrollment has apparently generated a tremendous amount of employee Benefit Plan participant inertia. The same inertia that kept and continues to keep eligible employees from initially signing up as 401(k) Benefit Plan participants, also keeps employees from taking maximum advantage of the 401(k) Benefit Plan after the employees are automatically enrolled in the 401(k) Benefit Plan. A substantial percentage of 401(k) Benefit Plan participants hired under an automatic enrollment policy exhibit "default behavior"—sticking to both the default contribution level and the default investment allocation, both of which is usually less than optimal with respect to future impact on the individuals or national budgetary policy.

For example, a study conducted by Hewitt Associates and released in July 2000 [See, for example, Hewitt Associates (in conjunction with Harvard University and the Wharton School of the University of Pennsylvania). "Enrolling Employees in 401(k) Plan Not A Cure All looked at the participation and default behavior of more than 53,000 eligible employees hired before and after automatic enrollment was initiated at two U.S. companies (Companies A and B) over a one to two-year period. Both companies automatically enrolled employees in conservative stable value funds at a two percent (2%) to a three percent (3%) percent contribution rate. As reported in the study, more than half of the eligible employees remained at the companies' conservative default elections for both contribution level and investment allocation.

Further, after the automatic enrollment program was implemented, an average of sixty three percent (63%) of eligible employees hired under automatic enrollment at Company A contributed at the default rate; fifty seven percent (57%) percent invested in the default fund and fifty one percent (51%) remained at both default elections. At Company B, an average of sixty two percent (62%) of eligible employees participating under automatic enrollment contributed at the default rate; sixty seven percent (67%) invested in the default fund and fifty eight percent (58%) remained at both default elections.

Similarly, the Madrian and Shea (2000) study (See, for example, Madrian, Brigitte C.; Shea, Dennis F. "The Power of Suggestion: Inertia in 401(k) Participation and Savings Behavior," NBER Working Paper No. W7682, May 2000) found that an average of seventy five percent (75%) of Benefit Plan participants hired under automatic enrollment contributed at the default rate of three percent (3%); eighty percent (80%) invested in the default money market fund and about sixty one percent (61%) did nothing to change their savings/investment behavior from the default specified by the plan sponsor or company if no other action was taken.

The good news for the automatic enrollment policy is that 401(k) Benefit Plan participation is much higher under the Benefit Plan automatic enrollment policy than when an affirmative election by an individual plan participant is required in order for an eligible individual employee to actively participate in the Benefit Plan. It is believed that the best explanation for the low participation rate of new hires, in the absence of an automatic enrollment policy, is that the decision to participate in the Benefit Plan is complicated, which leads individual employees to defer making a decision and to procrastinate with respect to making a definite decision. Utilization of an automatic enrollment policy apparently decreases the perceived complexity of the 401(k) Benefit Plan participation decision by decoupling the participation decision from the savings and investment decision.

The bad news, however, is that roughly sixty percent (60%) of the employees that have been automatically enrolled subsequently did nothing to increase their fairly low three percent (3%) contribution rate or to reallocate their contributions away from the default investment option to a more individually appropriate investment or to recognize the importance of appropriately individual funding for future liabilities, and then determine an appropriate individual funding policy and asset allocation model to best fund individually perceived future liabilities, and only then select investment vehicles based on the ability to implement the individual model allocation—thus recognizing that money management (i.e., security selection) is of secondary importance for passive, long-term investors. Again, complexity-induced procrastination appears to best explain why roughly sixty percent (60%) of automatic enrollees—the financially uninvolved—fail to change the initial default investment choices to more individually appropriate investment(s).

The "financially uninvolved," it is believed, have a much greater tendency to stick with the status quo investment(s) (when one is available) as financial decisions become more difficult. Additionally, it is highly likely that the "financially uninvolved" view the default contribution rate and investment allocation under automatic enrollment as including an implicit approval by their employer, who sponsors the Benefit Plan, of such investment decision as being the appropriate investment decision for them, the specific employee. In this respect the "financially uninvolved" may be correct in that, absent an affirmative election, one or more plan fiduciaries (typically including in this type of activity, the plan sponsor acting as a fiduciary) is responsible under the Employee Retirement Security Act of 1974 or "ERISA" (which is the law that is generally applicable to private sector retirement plans) for the default investment allocation.

The results from an automatic Benefit Plan enrollment policy also have implications for the design of public policies to encourage savings that have long term budget and budget deficit impact. The above described results of the present automatic Benefit Plan enrollment policy implementation strongly suggest that, if Social Security reform were to include the adoption of partially self-directed individual accounts, as proposed by the Bush Administration, a substantial percentage of individuals would end up with the default plan investments as specified by the Federal Government. In both cases, getting the default investment allocation "right" will have a tremendous impact on the distribution of retirement savings available to individual Benefit Plan participants. If the default investment allocation is not optimized, citizens, in general, and Benefit Plan participants in particular, will most likely have less retirement income, pay less tax and, as a result, create additional financial demands and stress on the government because, as a result of less optimum investment allocation during the life of a Benefit Plan participant, the government will collect less revenue and, thus, have less income at the same time government will most likely be experiencing increased demand for services from persons with inadequate retirement income. In this regard, existing evidence indicates that the negative effect caused by the increased demand for services from persons with inadequate retirement income would tend to be concentrated among persons who are the least advantaged members of United States society, and, as a result, the social strains resulting from such members, who have not fared well in optimizing their investment allocation, could be expected to increase. (See, for example, "Investment Without Education, The Disparate Impact of Women And Minorities in Self-Directed Defined Contribution Plans," by Jane Elizabeth Zaglein published in 2001 in the Employee Rights and Employment Policy Journal at 5 Empl. Rts. & Employ. Pol'y J. 223.)

Thus, in order to convert the present automatic Benefit Plan enrollment policy from an apparent win-lose proposition to a win—win proposition, a viable way must be developed to move "financially uninvolved" employees out of the default investment option(s) and into investment option(s) having individual appropriate contribution rates and investment allocations without compromising the Benefit Plan sponsors' need for freedom from any significant possibility of litigation by reason of providing asset allocation and savings assistance to Benefit Plan employees, which has been a considerable obstacle in the past.

Another problem that has surfaced is that Benefit Plan sponsors are increasingly concerned that by the Benefit Plan sponsors increasing the initial contribution rate, employees may be induced to opt-out of 401(k) Benefit Plan participation, and just as there has been and is participation inertia, there will be non-participant inertia as well.

The above-mentioned studies show that a majority of eligible employees who fail to act on deciding whether and how much to participate in a Benefit Plan will also be likely not to decide on how to optimally invest their contributions in an individually appropriate investment vehicle to achieve an individually appropriate investment allocation. Under the facts outlined by IRS revenue Ruling 98-30, if a Benefit Plan participant has made a no-investment election, then the Benefit Plan can invest the contributions in a balanced fund that includes both diversified equity and fixed income investment vehicles.

Many Benefit Plan sponsors are wary of choosing default fund allocations that includes equities because they are concerned that the Benefit Plan sponsors will be blamed if the investment returns fall or are negative during adverse market periods. Consequently, most automatic Benefit Plan enrollments use conservative investments (e.g., money market find or stable value find) as the Benefit Plan default allocation.

Additionally, IRS included a warning in IRS revenue Ruling 98-30 ruling that the Department of Labor will not consider the Benefit Plan participant or beneficiary to have exercised the type of control over Benefit Plan investment choices that is necessary to justify relaxing fiduciary responsibilities in the ERISA section 404(c) Benefit Plan regulations. In this case, the fact that the Benefit Plan participant or beneficiary is merely told of the Benefit Plan investments that will, in the absence of instructions to the contrary, be made on his or her behalf cannot be considered control of the Benefit Plan investment decision by the Benefit Plan participant. Therefore, other Benefit Plan fiduciaries will not be relieved of responsibility for the results of the Benefit Plan investment by reason of ERISA section 404(c).

Finally, as noted above, many employees consider the Benefit Plan default investment as affirmative Benefit Plan investment advice received from the company or Benefit Plan sponsor. A person who provides Benefit Plan investment advice with respect to retirement assets under ERISA is acting in a fiduciary capacity, and such advice must comply with ERISA's general prudence requirements. Specifically, ERISA .sctn.404(a)(1)(B) states that "the fiduciary should act with the care, skill, prudence, and diligence under the circumstances then prevailing that a prudent man acting in a like capacity and familiar with such matters would use in the conduct of an enterprise of like character and with like aims." Thus, it appears highly questionable that a prudent expert would ever use a "one size fits all" investment selection approach for all individual Benefit Plan participants (such as investing in a money-market fund), given the clear known existence of the enormous individual differences in funding requirements, time horizon, risk tolerance, etc., and other factors related to making an optimum asset allocation and investment decision, including Benefit Plan asset allocation.

Moreover, prudent procedures generally require that an appropriate allocation of Benefit Plan investment asset classes be used that will yield the highest probability of meeting a particular Benefit Plan participant's long-term investment objectives without exceeding tolerances for short-term investment market volatility. Again, it is highly questionable that a prudent expert would recommend a conservative Benefit Plan investment allocation such as a money market fund for younger Benefit Plan participants, which when combined with a low Benefit Plan default contribution rate, will likely ultimately result in the realization of an inadequate amount of savings in order to fund future retirement income needs at an appropriate level without placing undue financial burdens on various government organizations and adversely impacting national budgetary considerations.

The Benefit Plan default investment allocation is important because a number of studies have concluded that Benefit Plan asset allocation decisions have the greatest impact on the overall long-term performance of a Benefit Plan investment portfolio. A recent study found that, for passive, long-term investors, asset allocation determines about one hundred percent (100%) of performance-regardless of whether one is measuring return variability across time, return variation between funds, or return amount. For the short-term investor, who trades more frequently, invests in individual securities, and practices market timing, asset allocation has less of an impact on returns. Thus, the impact of asset allocation on performance is directly correlated with investment behavior. (See for example, Roger G. Ibbotson and Paul D. Kaplan, "Does Asset Allocation Policy Explain 40%, 90%, or 100% of Performance?," Financial Analysts Journal, January/February 2000.)

It is believed that this study has particular significance for workers using 401(k)-type plans to save for retirement. A study of year-end 1998 data by the Employee Benefit Research Institute and the Investment Company Institute (ICI) found that approximately seventy-five percent (75%) of 401(k) participants had not changed their equity allocations in the previous two years. Thus, a substantial percentage of 401(k) participants exhibit long-term, passive investment behavior when managing their self-directed retirement assets. For the great majority of 401(k) participants (i.e., the "financially uninvolved"), asset allocation (rather than security selection or market timing) is the dominant determinant of performance on their individual plan accounts.

The problem with specifying a one-size-fits-all Benefit Plan default allocations is that, for individuals, appropriate Benefit Plan contribution levels and asset allocation determinations are based on the employee's unique needs and circumstances, which change over time as employees get closer to retirement and individual employee wealth increases. The Benefit Plan goal should be to devise appropriate long-term investment strategies that will assist employees with meeting both their short, intermediate and long term investment objectives with the least amount of unacceptable or inappropriate risk for their particular circumstances at a particular time. The risk an individual employee can afford not only depends on his/her attitude towards risk, but his/her total financial situation. The earning ability outside the employee's investments in the Benefit Plan is also important in determining the individual employee's capacity for risk. Employees with high earning abilities are able to take more investment risk, because they can, more easily recoup from poor performing investment and resulting financial losses than those employees with lower earning abilities can.

The first step in arriving at appropriate Benefit Plan default investment strategy is to coordinate a savings plan with an optimal portfolio that facilitates the Benefit Plan participant to appropriately find future retirement income needs. The criterion used for selecting the initial Benefit Plan investment allocation is based on cash flow needs and Human Capital; Human Capital being defined as the actuarial present value of future retirement savings, Benefit Plan pension income, and Social Security income. Thus, the variables important to the calculation of Human Capital include retirement savings (401(k), IRA, etc.), current and retirement age, mortality and life expectancy, gender, real long term interest rates, Benefit Plan pension income and Social Security income. Human Capital is usually the dominant asset for young and middle-aged employees as Benefit Plan financial assets would be a tiny fraction of their total wealth.

Thus, in accordance with the above, it is quite reasonable for younger employees to hold an all-stock investment Benefit Plan allocation, because of their ability to offset short-term losses through adjusting future Benefit Plan investment strategy, consumption and savings. As employees become older, the proportion of Human Capital in total wealth becomes smaller; therefore, over time the Benefit Plan investment allocation needs to be gradually adjusted to become less aggressive.

As previously discussed, it makes little sense to use automatic Benefit Plan procedures to enroll younger employees and increase their Benefit Plan contribution level over time, and then use the Benefit Plan's money market fund, or similar vehicle as the default Benefit Plan investment choice to invest their Benefit Plan contributions. Similarly, it may be imprudent to use the Benefit Plan's balanced fund, or similar vehicle as the default Benefit Plan choice for older employees, who may lack the ability to make up losses that may occur during adverse market conditions.

Another problem that has long been acknowledged relating to optimizing investment portfolios for Benefit Plan participants is that the entities and/or persons most capable of delivering an optimum investment solution typically have financial interests that may be or are inconsistent with that of the individuals who need investment allocation services. For example, in the case of entities that administer Benefit Plans, they are typically the same entities that traditionally manage the investments of the investment vehicles normally offered in connection with Benefit Plans. Such investment managers receive most (if not all) of their compensation as a percentage of assets managed, with such percentages varying according to the nature of the risk associated with the particular investment vehicles. For example, an international equity find would typically pay a manager a higher percentage resulting in a higher net profit than a domestic bond fund manager for finds having approximately the same assets under management. In the case of financial intermediaries (such as licensed securities brokers), they typically receive differing levels of initial and subsequent commissions depending on the investment they choose or advise a person to choose.

Similar or identical conflicts of interest also occur when determining how to invest at a time when persons are no longer working. For example, investors must choose at that time whether to purchase a stream of income (e.g., an annuity) in order to hedge against the risk of outliving the money that has been put aside for retirement. Persons who typically provide assistance with these decisions receive commissions when they sell annuities and therefore have or may have interests that could affect the quality of the assistance that they provide. Persons who manage investments for a person, and are compensated based on a percentage of the amount they manage, would have an incentive to recommend or otherwise cause a person to withdraw amounts as slowly as possible in order to maximize the income of the investment manager at the expense of the investors best interest.

These situations could lead to persons with inconsistent interests intentionally or unintentionally acting to cause amounts to be saved or invested so that these persons with inconsistent interests enjoy a higher income, a situation possibly not in the best interest of the individual Benefit Plan participant whose funds are being invested by the persons providing traditional services for the Benefit Plan.

Thus, there is a clear need for a new and innovative investment program that eliminates or at least significantly ameliorates this economic conflict of interest by, for example, providing for a separation between the entities or entity that determines how much to save and how the savings should be invested from other compensated functions such as the investment management. Such an investment program should provide compensation for the critical functions of determining how much an individual should save and how the savings should be invested in a manner that reduces or eliminates conflicts of interest including those that result from receiving compensation from other sources including compensation from investment management.

Such a new and innovative investment program should be implemented by separating or not separating the Benefit Plan allocation and savings function from the Benefit Plan money management function in such a way that conflicts are, if not eliminated, at least ameliorated. As is known, the substantial effect of conflicts on financial institutions has been documented in the Study (Conflicts of Interest and the Credibility of Underwriter Analyst Recommendations by Michaely and Wolmack published in 1999) that was cited before Congress in the hearings in Congress held on Jun. 14, 2001, by the Committee on Financial Services, Subcommittee on Capital Markets, Insurance and Government Sponsored Enterprises on "Analyzing the Analysts: Are Investors Getting Unbiased Information from Wall Street". By providing that the two functions may be separated so as to ameliorate or eliminate such conflicts, implementing such a new and innovative investment program would increase the likely and perceived quality of the Benefit Plan allocation services with a corresponding positive effect on the marketplace and individual Benefit Plan participant confidence, thus making optimum Benefit Plan savings more likely.

The above separation should also eliminate the need for artificial and less precise mechanisms to address issues such as fee leveling (charging the same fees for each investment vehicle), as these other methods do not precisely address the fundamental conflicts, which are variable profits, since the same fee may result in higher profits. The above separation should also eliminate offsets, or offsetting the cost of investment vehicles with higher fees by rebating a portion of the fees, directly or indirectly to a Benefit Plan, which also may cause certain functions to be more profitable and others to be underpaid because, like fee leveling, offsets only addresses the gross amount (and not the profits) of the fee paid.

Thus, there is a clear need for a new and innovative investment program that separates the Benefit Plan allocation and money management function, which would be a significant improvement over the aforementioned offset mechanisms, as the Benefit Plan allocation and money management function separation also addresses conflicts that can occur during both the Benefit Plan accumulation and disbursement modes for investing when the subject services (e.g., Benefit Plan asset allocation, Benefit Plan formulation/implementation of saving plans, and Benefit Plan formulation/implementation of distribution plans) are controlled by the same person.

In this connection, there is also a need to insure that the above services, which have traditionally been paid for indirectly, e.g., from commissions paid for executing Benefit Plan stock trades or fees from Benefit Plan money management, are ameliorated, as this traditional payment may have contributed to the unacceptable current state of affairs, which finds that many persons will not obtain the benefit of the subject Benefit Plan services if they have to pay a separately stated fee for them, even though the subject Benefit Plan services clearly provide more value than other Benefit Plan services for which participants pay more (e.g., Benefit Plan asset management). Typically, when other services subsidize the subject Benefit Plan services, there is a temptation for Benefit Plan service providers to maximize their profits, often in a manner that is to the detriment of an individual Benefit Plan participant (e.g., churning or excessive trading), making it desirable to separate these Benefit Plan services from other Benefit Plan functions so that the fees for the Benefit Plan subject services can remain nonobvious, but that other Benefit Plan functions that subsidize these Benefit Plan services will not be utilized in a manner that disrupts the subject Benefit Plan services. This is believed to be significant because the subject Benefit Plan services will determine the great majority of an investor's investment returns.

In this regard, the new and innovative investment program should address the conflict of interest that could occur in connection with the following: the system commits investors, with a minimum of indicative data, to as automatically as is possible or practical, allocate a portion of the investors' future salary increases towards retirement savings, based on formulae originated and/or approved by a person or persons, possibly including a determination of what constitutes a minimum of indicative data, who are independent of persons who receive other compensation such as fees for Benefit Plan money management. Ideally, the new and innovative investment program should result in automatic Benefit Plan deductions from which Benefit Plan participants have to affirmatively elect to opt out of, if they wish to discontinue Benefit Plan participation and/or change their contribution to the Benefit Plan.

The systems and methods of the new and innovative investment program should automatically as is possible or practical allocate Benefit Plan investment assets to an optimal combination of asset classes on a regular basis, based on the unique facts and circumstances of each individual investor, either based on an election by the person whose assets are invested or by a third party who is independent of persons who earn variable fees and profits by reason of the allocation of the assets or the savings levels established, in order to systemically address and ameliorate any potential conflict of interest. The Benefit Plan allocation should result either from a single or multiple affirmative directions or in the case where a third party can act on behalf of the individual, with no direction from the individual.

The systems and methods of the new and innovative investment program should choose or assists persons in choosing an appropriate manner in which to receive Benefit Plan income during a time when they are no longer saving but instead consuming prior savings (e.g., at retirement).

The systems and methods of the new and innovative investment program should provide for oversight of the conditions designed to eliminate or ameliorate conflicts of interest within the Benefit Plan.

The systems and methods of the new and innovative investment program should provide a guarantee, whereby professional Benefit Plan allocation is precisely implemented according to the criteria specified by the Independent expert and is guaranteed to those investors who participate in the investment program.

The systems and methods of the new and innovative investment program should in addition to using automatic Benefit Plan savings based on the unique characteristics of the individual Benefit Plan participant (which savings amounts are formulated or approved by the Independent expert), including automatic enrollment in pension plans, to provide appropriate savings, resulting in most cases a substantial boost in savings, and in the case of pension plans to increase Benefit Plan participation rates and then automatically tailor each investor's Benefit Plan investment plan to each investors unique circumstances, making appropriate changes on a regular basis, without obtaining an affirmative election from the Benefit Plan participant each time a change is made, while, in the case of pension plans, help address the needs of the employer who sponsors the Benefit Plan for participant investment safety.

The systems and methods of the new and innovative investment program should address the above indicated needs by utilizing safeguards that address the Benefit Plan conflicts of interest, thereby reducing the Benefit Plan sponsors' responsibility and exposure in selecting and monitoring the Benefit Plan investment program.

The systems and methods of the new and innovative investment program should address the problems resulting from the fact that currently, individual Benefit Plan participants are either: 1) too involved in the process of selecting Benefit Plan investments and frequently do so by choosing Benefit Plan investments based on the recent performance of individual Benefit Plan investment vehicles; 2) do not save appropriate amounts to meet their goals, including retirement; or 3) more often, feel that they do not have the time, interest, and/or expertise to make appropriate Benefit Plan investments or structure appropriate Benefit Plan savings plans.

The systems and methods of the investment program should solve the above problems by minimizing the input required by individuals and automating the Benefit Plan process to the greatest possible extent while eliminating or ameliorating the conflict of interest that normally exists between parties that provide these Benefit Plan services.

The systems and methods of the new and innovative investment program should enable a person who operates the Benefit Plan investment program to, offer a meaningful guarantee (e.g., no fees are owed if the investment program is not 100% effective) regarding its effectiveness. The guarantee can be that the allocations for investors will precisely match the criteria of the Independent Expert. No person who currently offers "investment advice" or "education" and is solvent has or could reasonably offer a meaningful guarantee.

The systems and methods of the new and innovative investment program should offer such a guarantee because they are granted discretionary investment management authority from the individual plan participant or a third party on behalf of an investor, and thus exercise control of the allocations on a regular basis. "Investment advisors" will not make such a guarantee because they are granted non-discretionary investment management authority, and thus do not exercise control of the allocations on a regular basis.

The systems and methods of the new and innovative investment program should result in limiting legal exposure by providing an automatic allocation based on the individual characteristics of participants and a formula established by an Independent Expert.

The systems and methods of the new and innovative investment program should provide a data processing system that reduces their input and enables individuals, including 401(k) participants, or persons acting on their own or their behalf, to turn over some or all of these decisions to others, including the ability to automatically enroll and commit employees in advance to allocate a portion of their future salary increases towards retirement savings, which participants have to opt out of if they wish to discontinue. The net result should be that individuals are more likely to achieve their goals mostly because it utilizes the natural tendency of most individuals to minimize their involvement (many take no action whatsoever) in formulating and implementing savings and investment plans.

The systems and methods of the new and innovative investment program should minimize individual involvement as such has a corollary benefit in that when individuals are too involved individuals tend to engage in excessive trading of their individual accounts. Research demonstrates that active trading, on the average, materially diminishes investment returns. If individuals are less involved, individuals are less likely to trade and are therefore more likely to enjoy greater investment returns.

The systems and methods of the new and innovative investment program should recognize a savings method, like automatic enrollment, that is grounded in findings about the psychology of decision-making. First, most workers realize they need to save more, but lack discipline. Second, restrictions on consumption are much easier to accept if they do not affect current consumption (i.e., they take effect in the future). For example, we all plan our exercise and dieting regimes to start next week or month. Third, people are very sensitive to perceived losses in their welfare. While we can imagine foregoing some gain, bearing a loss is much more difficult. And fourth, people tend to code gains and losses in nominal rather than real dollars, so, for example, a pay increase that is less than the rate of inflation may still be considered a gain rather than a loss.

The systems and methods of the new and innovative investment program should use the principles that current plan participants with low contribution rates (i.e., less than 3 percent) and new/existing employees who are not yet participating in the plan are automatically enrolled in a plan that asks for a modest commitment now that gradually increases their contribution level over a period of a few years. The amount should generally be a fixed percentage (e.g., 2–3%) or a proportion of the pay increase (e.g., ⅓ or a ½).

The systems and methods of the new and innovative investment program should, by timing the increase to coincide with the pay increase, assure employees that their take home pay does not diminish. In fact, since the contribution to the saving plan is tax deductible, only part of the increased saving is out-of-pocket, and the actual change in the paycheck is likely to be unnoticeable. The increases continue until the worker reaches the appropriate tax sheltered contribution, or until the worker opts out of the plan.

The systems and methods of the new and innovative investment program should, once employees are in the plan and automatically use this savings method, recognize the inertia will help keep the employees in the plan, as the vast majority of employees will not notice the difference in take home pay, but in a few short years certainly notice the difference in their individual Benefit Plan account balance. In fact, since the contribution to the savings plan is tax deductible, only part of the increased savings is out-of-pocket, and the actual change in the paycheck is likely to be unnoticeable.

The systems and methods of the new and innovative investment program should use a data processing system that collects, monitors and directs information from individuals including pension plan participants, sponsors, recordkeepers and money managers, to optimally allocate investment assets, including but not limited to pension assets, for individual investors/plan participants based on their unique facts and circumstances, with a minimum of input from the individual including a single election or without an affirmative election from plan participants. Such allocation should be automatically used to invest individual investment assets, including assets in a 401(k) plan, which will be monitored and automatically adjusted over time by qualified experts, unless the individual elects to opt out of the automatic allocation plan with an affirmative investment election.

The systems and methods of the new and innovative investment program should be used in conjunction with the automatic enrollment and contribution methods discussed above. As such, it can be used by plans that use automatic enrollment for new employees, and for current employees who either do not currently participate in the plan or do participate in the plan but have not elected compensation reduction contributions of a minimum amount (e.g., at least 3 percent). In addition to 401(k) plans, the automatic allocation plan will be made available to 403(b) retirement plans, which serve millions of employees of public schools, educational and charitable organizations, and to 457(b) plans, which serve employees of state and local governments.

The systems and methods of the new and innovative investment program should insure that an appropriate allocation is made for each individual participant on a regular basis, the data processing system will include a relational database that will be continually updated with relevant employee indicative data (e.g., age, salary) and employer plan data (participation status, investment options, employer match, account balance, etc.), which is provided from outside sources including the employer and the plan recordkeeper. The data is used to feed the financial analytic engine that will automatically allocate an optimal investment portfolio on a regular basis—based on the participant's retirement income replacement needs and human capital value.

SUMMARY OF THE DISCLOSURE

Therefore, an object of the present disclosure is to provide an investment solution to investors, including Benefit Plan participants, in attaining appropriate savings levels and asset allocation for their investments including assets in their individual plan accounts on a regular basis.

Another object of the present disclosure is to provide a new and innovative investment program that provides for appropriate savings, including utilization in self-directed Benefit Plans.

Another object of the present disclosure is to provide the ability to collect indicative data from a variety of sources, including the investor, which is used to determine appropriate savings levels and asset allocations for investors on a regular basis, including individual Benefit Plan participants.

A further object of the present disclosure is to provide for the automatic savings and/or allocations of investment assets (including making such allocations on an ongoing basis) based on an analysis of indicative data.

A still further object of the present disclosure is to assist individuals in determining how to invest and in choosing an appropriate manner in which to receive income during a time when they are not longer saving, but instead consuming prior savings (e.g., retirement).

The new and innovative investment program, which includes the present systems and methods, integrates the level of savings with appropriate asset allocation in a manner that minimizes input by investors on a regular basis. Investors may be assisted in providing their information and making appropriate decisions by a facilitator. The determination of how much to save and how to allocate investments is determined by person(s) compensated in a manner which is generally or totally separate and independent from other fee generating functions such as traditional investment management fees (normally a percentage of the assets under management).

The systems and methods of the present disclosure eliminate or at least ameliorate possible economic conflict of interest by separating or, appropriately combining, the determination of how much to save and how to allocate investment assets from other fee generating functions such as investment management. The person(s) who determines or approves the asset allocation and savings rate (the Independent Expert) receives fees that are generally or totally independent from the fees charged for investment management. The Independent Expert is generally or totally independent from and unrelated to any other person who receives compensation in connection with the subject transactions (which transactions include a decision not to change any decision including asset allocations) including any investment manager. The systems and methods of the present disclosure can assure that the investment manager is unaware of the individual pension participant investments, but rather sees only the aggregate investments of a Benefit Plan sponsor.

One aspect of the present disclosure is a unique data processing system that provides expert independent asset allocation on a basis that minimizes the input and time of investors and similarly assists them in establishing savings investment programs while, at the same time, offering professional asset management (including index funds) at a more efficient cost structure and eliminates or reduces all of the conflicts of interest that would exist in all the presently known schemes of providing investment allocation and/or savings investment programs to investors, including Benefit Plan participants.

One representative system for providing asset allocation and savings services to individuals includes a data storage for storing data from a plurality of sources, including the individual; means for processing the data from each source such that a savings investment program as well as an asset allocation model consisting of at least one asset class is established, the asset class(es) may including varying proportions of shares (or other interests) in a plurality of investments, possibly including collective investment vehicles; and a means for allocating assets into a combination of at least two assets classes as appropriate for each individual and generating a tangible report recommending, or directly establishing a savings investment program that is appropriate for each individual.

One representative computer implemented method for providing independent asset allocation and savings investment programs to individuals for investing in one or more asset classes including professionally managed, cost efficient, commingled investment vehicles while eliminating or ameliorating the conflict of interest between establishing asset allocation and investment programs and other functions such as money management includes the steps of: developing mechanisms that elicit the funding needs of each individual; developing a savings investment program and an asset allocation model consisting of at least one asset class generally using generally accepted principles of modern portfolio theory; applying the data from a plurality of sources to the asset allocation model; coordinating the savings investment program with the asset allocation model; determining an appropriate investment vehicle or combination of vehicles for the individual; and implementing investments in at least one asset class or at least (1) combination of at the at least two (2) asset classes.

Other objectives and advantages of the present application will become apparent from the following description, the accompanying drawings and the appended claims.

DETAILED DESCRIPTION OF THE DISCLOSURE

Figure 1:
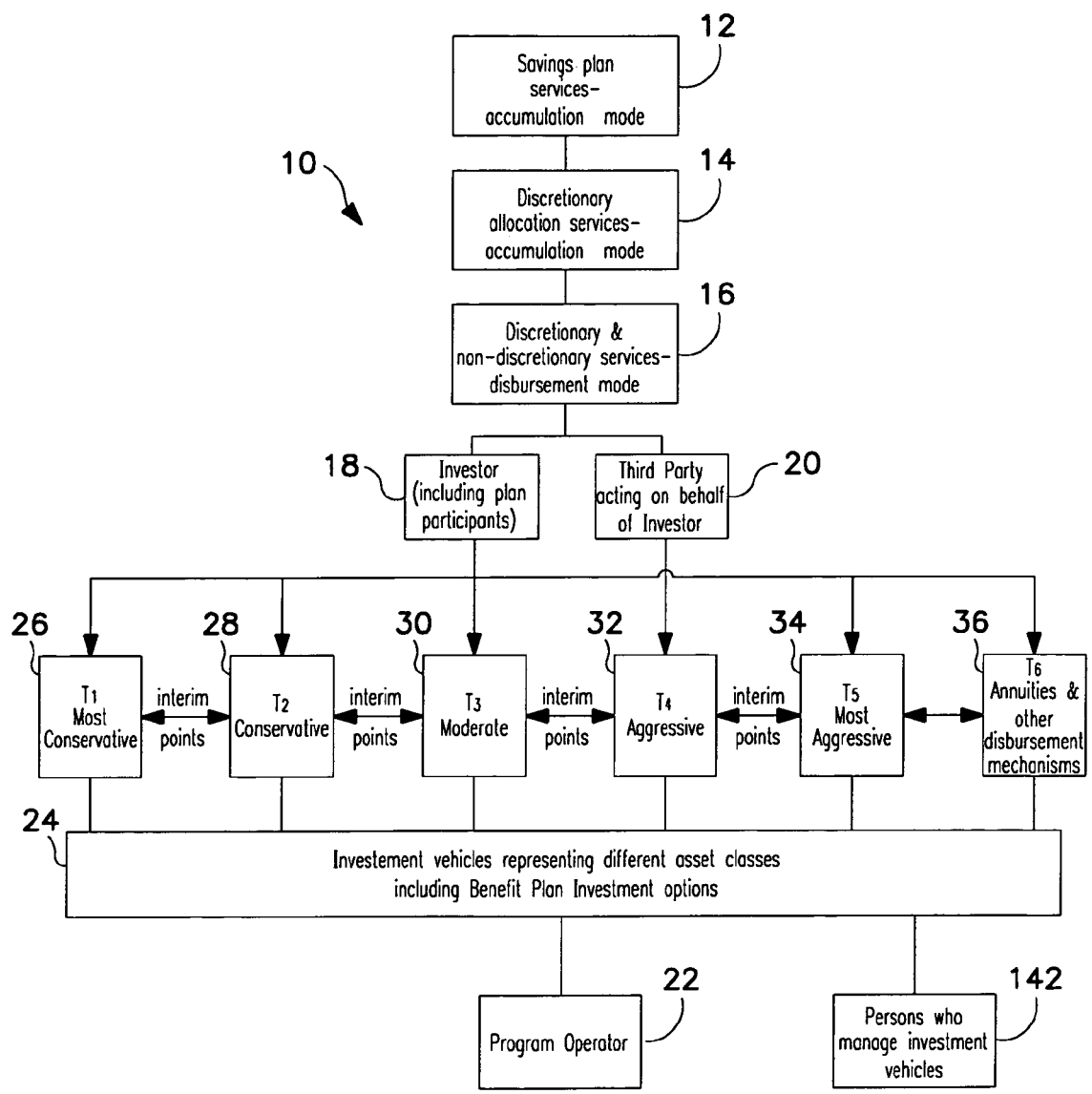
FIG. 1 is a block diagram generally illustrating the structure of a representative investment program including representative systems and methods related thereto.

In carrying out the present disclosure in representative preferred forms thereof, we have provided a representative new and innovative investment program 10 that includes representative systems and representative methods for providing representative savings plan services 12 and discretionary asset allocation services 14 during the accumulation mode (e.g., prior to and during employment), and discretionary and non-discretionary asset allocation services 16 during the disbursement mode (e.g., after employment) for an investor 18 such as, for example, a participant in a Benefit Plan, or a third party 20 acting on the investor's behalf, as illustrated in FIG. 1. Savings plan services 12 are those services that assist investors during the accumulation mode such as helping to determine or simply implementing the timing and amount of amounts deducted from a paycheck for contribution to a savings arrangement or vehicle such as a Benefit Plan.

In implementing these representative systems and representative methods, an investment program operator 22 will generally offer the investment program 10 together with representative investment allocations 26 (i.e., a most conservative allocation), 28 (conservative), 30 (moderate), 32 (aggressive), and 34 (most aggressive), as well as annuities and other disbursement mechanisms 36, which are formulated with investment vehicles 24 representing different asset classes that may be used to implement the investment program 10. Any such allocations 26, 28, 30, 32, and 34 and/or annuities and other disbursement mechanisms 36, as well as the investment vehicles 24 and asset classes used to implement the investment program 10 during the accumulation and disbursement mode(s), are selected by or subject to the approval of an Independent Expert 38, as defined hereinafter (see FIG. 2), who must find or approve that the investment program 10 can be implemented using the investment vehicles 24 and annuities and other disbursement mechanisms 36.

Figure 4:
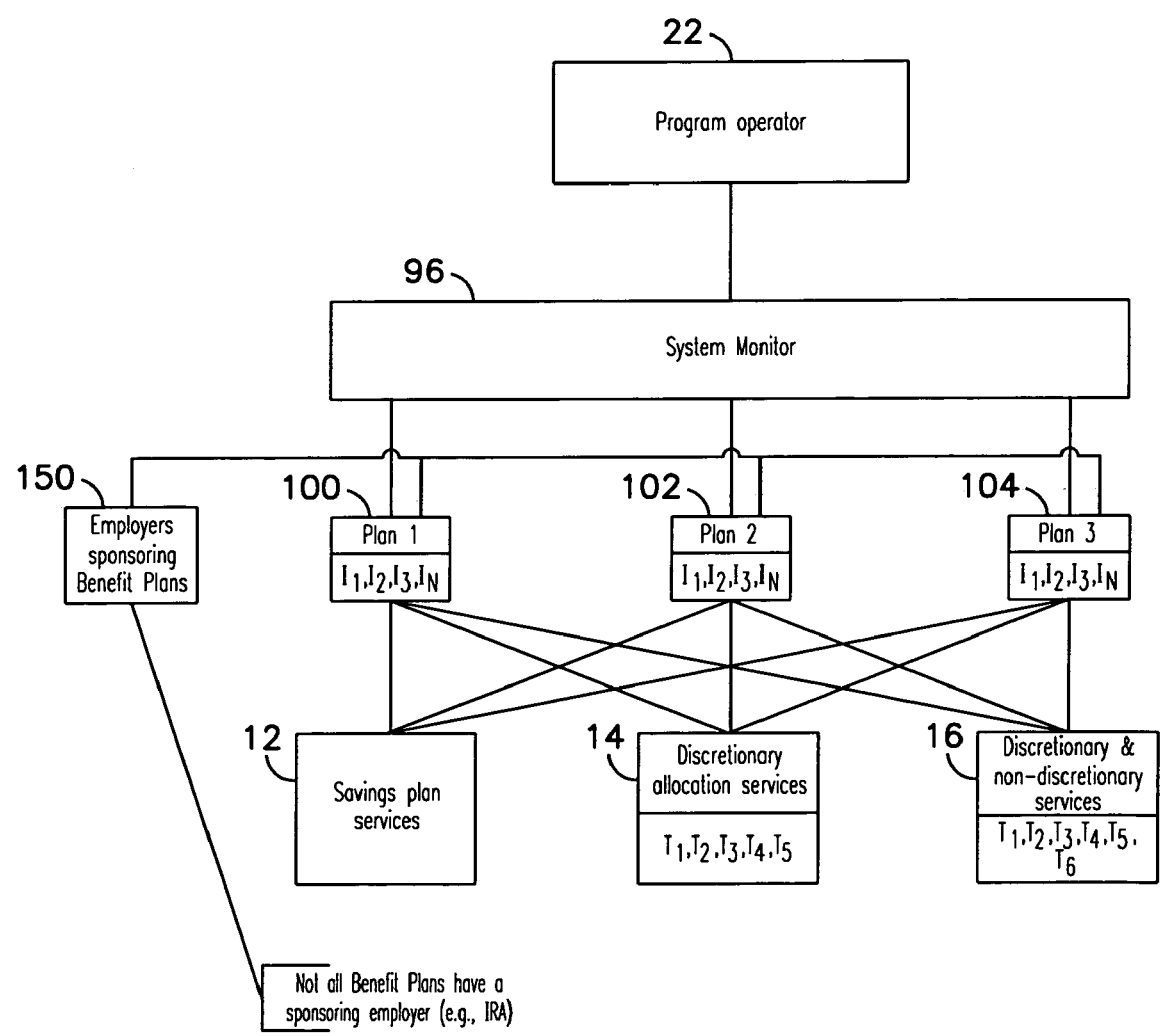
FIG. 4 is a representative diagram illustrating one representative investment allocation and management system of the present disclosure as seen by benefit plans.

Investor 18, as used in the present application, is a natural or unnatural person who could benefit from one or more of the services 12, 14, and 16 under the investment program 10, including individual participants and/or beneficiary of a Benefit Plan who may direct the investments of their individual plan account(s). Thus, the term participants in Benefit Plans, as used in the present application, include participants and beneficiaries in Benefit Plans. As illustrated in FIG. 4, Benefit Plans 100, 102, and 104 are arrangements, including associated vehicles, designed to assist natural persons in saving for the period that begins after termination of employment. A third party 20 is any person who is responsible for making determinations on behalf of an investor whether and how to utilize one or more of the services 12, 14, and 16 offered under the investment program 10.

In the case of an investor 18 with a large amount of assets, the investment program operator 22 may negotiate with regard to the investment vehicles 24 and/or annuities 36 used to implement the investment program 10 and even as to the formulae upon which asset allocation and/or distribution will be determined, subject to the approval of the Independent Expert 38. (As defined herein, the Independent Expert is a person or persons who is generally or totally independent of persons involved in the Investment Program 10 who may have interests that are not consistent with the investors 18, in certain circumstances an employer sponsoring one or more Benefit Plan(s) 100, 102, and 104 may be an Independent Expert 38). The negotiations may include the extent to which a separate fee is paid for the investment program 10 and/or the extent to which any such fees is subsidized by the fees paid in connection with investment vehicles 24 and/or annuities and other disbursement mechanisms 36 that are affiliated with the program operator 22. The program operator 22 then offers discretionary asset allocation during the accumulation mode 14; formulation/implementation of (as well as advice) regarding savings plan services 12 during the accumulation mode and formulation/implementation of (as well as advice on) discretionary and non-discretionary asset allocation during the disbursement mode 16. These services 12, 14, 16, and 18 may be offered singularly or in any combination.

The investor 18, or a third party 20 acting on behalf of an investor, including participants in Benefit Plans 100, 102, and 104, then chooses which services 12, 14, 16 to utilize and selects which investment assets 24 they wish to be in the program 10. For example, in the case of a section 401(k) plan, the person acting at the plan level 100, 102, and 104 may decide that amounts that the employer contributes to the plan will be invested in employer securities and will not be part of the investment program 10. And, in the case of an investor 18, including participants in Benefit Plans 100, 102, and 104, at least one may also wish to constrain certain assets (e.g., do not sell the home I rent to my mother) and receive asset allocation services on the non-constrained assets.

In cases where a third party 20 (e.g., the employer sponsoring the plan) acts on behalf of an investor 18 who is a participant in a Benefit Plan 100, 102, and 104 to cause the investor 18 to participate in one or more services 12, 14, and 16 of the investment program 10, the investment program 10 will generally provide an opt out provision 40, which will enable an individual plan participant to opt out at 42 of one or more services of the investment program 10. Under limited circumstances, there may be no ability to opt out of the investment program 10.

Figure 2:
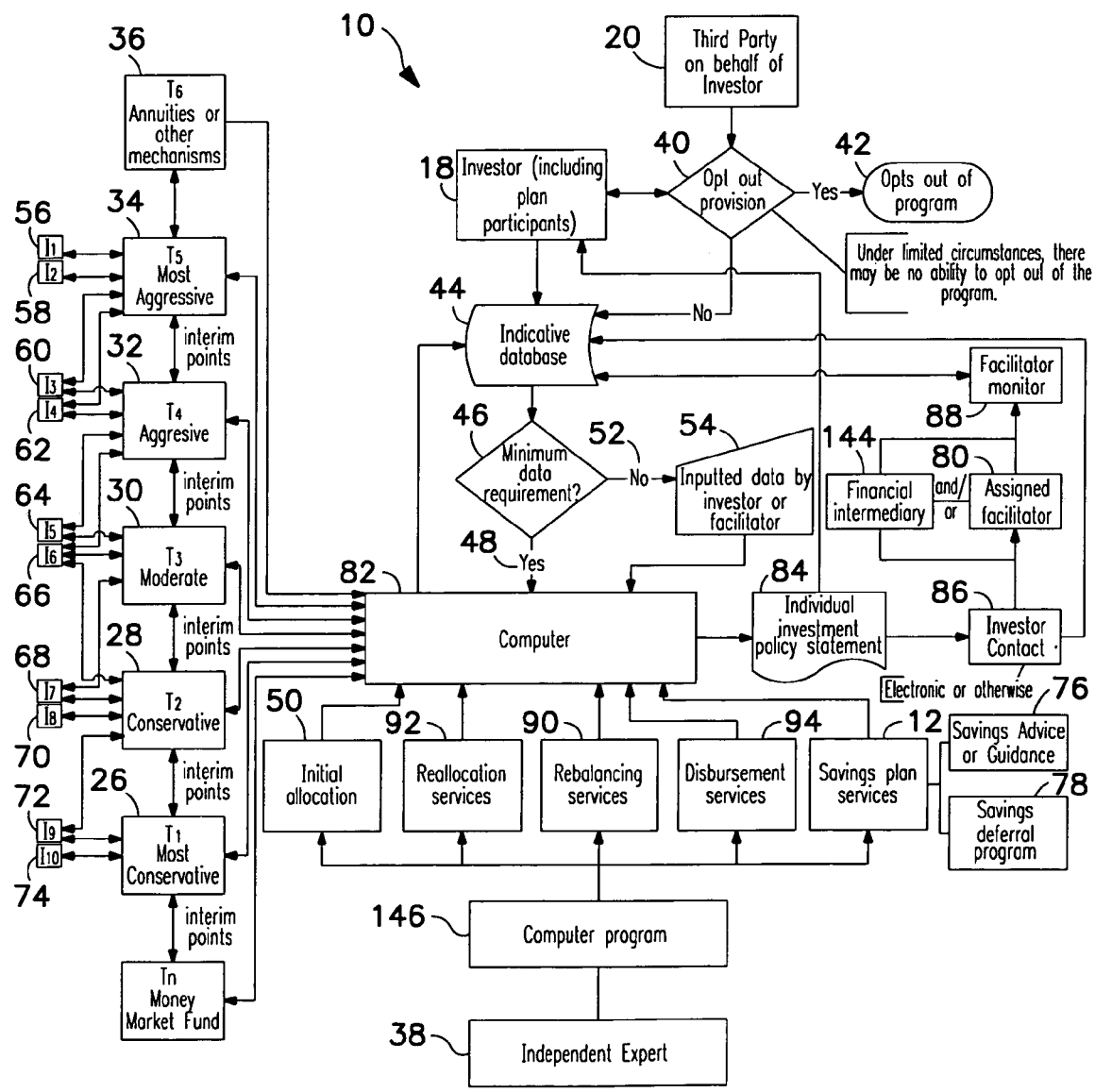
FIG. 2 is a representative detailed block diagram of one representative implementation of one representative investment program incorporating the systems and methods related thereto.

As illustrated in FIG. 2, data included in indicative database 44 (which can be obtained from the investor 18 such as a participant in a Benefit Plan and/or a third party 20 such as benefit plan recordkeepers, payroll offices, custodians, etc.) regarding the investor 18 is then provided by the investor 18 and/or third party 20.

In this connection, the Independent Expert 38 determines or approves the minimum data requirement at 46 necessary to make an initial discretionary asset allocation 50 during the accumulation mode with or without any additional input from the investor 18 in a Benefit Plan. If the minimum data requirement 46 is met at 48, then the investment program 10 can make the initial allocation at 50 of the investment assets to be held during the accumulation mode 14. If the minimum data requirement 46 is not met at 52, then the additional information may be inputted at 54 by other means, such as, for example, by a facilitator 80 calling an investor 18 in a Benefit Plan on the telephone, and then obtaining and inputting additional data on behalf of the investor 18.

Once the minimum data requirement is met at 48, then the investment program 10 makes an initial allocation at 50 of the investment assets to be invested during the accumulation mode 14 consisting of an allocation to 26, 28, 30, 32, and 34, which are one or more investment vehicles 24 that represent one or more asset classes. Existing investments are converted, through sales and/or purchases or otherwise at 56, 58, 60, 62, 64, 66, 68, 70, 72, and 74 to the investment vehicles 24 used to implement the investment program 10. Amounts are deducted from the pay or income stream of each investor 18, purchases from the investment vehicles 24 used to implement the investment program 10 are made. In the disbursement mode 16, distributions from investment vehicles 24 are scheduled and/or purchases of annuities 36 are made or other mechanisms are utilized.

Additionally, the investment program 10 can implement the savings plan services 12 during the accumulation mode 4. The savings plan services 12 include: advice or guidance with regard to the timing and amount of savings at 76; and/or the automatic implementation of a savings deferral program at 78, which is coordinated with discretionary asset allocation services during the accumulation mode 14. The data related to the savings plan services 12 can come from a variety of sources and include, but are not limited to salary and amounts saved, including amounts in other Benefit Plans 100, 102, and 104.

In connection with the collection of initial data, a facilitator 80 may assist the investor 18 with an understanding of the investment program 10, and in collecting and transmitting data necessary to meet the minimum data requirement at 46 as solely determined by the Independent Expert 38. As presently envisioned, the facilitator 80 has no ability to formulate or vary the formulation of any services 12, 14, and 16 provided under the investment program 10. Also, the compensation of the facilitator 80 will generally be designed and implemented such that there will be no incentive to depart from the program's allocations at 26, 28, 30, 32, and 34 during the accumulation mode 14, and annuities and other mechanisms 36 during the disbursement mode, though the facilitator 80 may generally receive increased compensation for success in enrolling/maintaining individual plan participants in the investment program 10, but generally may not receive increased compensation for the allocation mode 14 and the amount saved under the amounts saved 12 pursuant to the savings plan services during the accumulation mode 14, and annuities and other mechanisms 36 during the disbursement mode 16.

Rather, the principal role of the facilitator 80 is to elicit current, complete and accurate information from the respective investor 18 on a regular basis. The facilitator 80 may also provide information to the investor 18, explaining the operation and the benefits of the investment program 10 on a regular basis, which may take into consideration significant economic events (e.g., recession). In this regard, the facilitator 80 may regularly contact the investor 18 to obtain and/or supply current information. For example a facilitator 80 may assist an investor 18 in 401(k) investment plans with the decision as to whether or not to elect to opt out at 42 of the savings deferral program 78 and/or allocation program 14 that was implemented automatically at the direction of a third party 20. The facilitator 80 may directly input information into the indicative database 44, resident on the computer 82, on behalf of an investor 18.

If such data is directly inputted at 54 into the indicative database 44, selected services 12, 14, and 16 of the investment program 10 are then implemented. At a time shortly before or after the implementation, an investor 18 may receive an individual investment policy statement 84. This statement 84 confirms the indicative data inputted into the indicative database 44 and the action that will be or was taken based on 44 that indicative data. The investment program 10 may contact at 86 the investor 18 on a regular or irregular basis through electronic means or otherwise. The investor 18 may be assigned to a facilitator 80, who may contact the investor 18 on a regular or irregular basis for the purposes previously described. The quality of the services provided by the facilitator 80 will generally be monitored by a facilitator monitor 88, which may be embodied as a computer program designed or approved by the Independent Expert 38. The facilitator monitor 88 may determine, among other things, whether the data included in indicative database 44 was appropriately provided, and whether the investment vehicles 24 and the savings plan services 12 were appropriately provided and implemented, in accordance with the data received.

Another innovative aspect of the present system and methods includes provisions for making certain adjustments to the allocations 14, savings 12 and/or disbursements 16 under the under the investment program 10, which may be made on an ongoing basis. Adjustments may be made based on updated information, on information obtained via contact with a facilitator 80 or otherwise by investor contact at 86. The updated information is inputted at 54 into the computer program resident on the computer 82 and changes, if any, to the allocation(s) 26, 28, 30, 32, and 34 and savings plan services 12 are implemented based on the new information received in accordance with the procedures established or approved by the Independent Expert 38. Other changes, including reallocation of assets using reallocation services 90, will be made due to the passage of time (e.g., the aging of the individual plan participant) and external changes (e.g., changes in the capital markets) also in accordance with the procedures established or approved by the Independent Expert 38.

Disproportionate investment returns may also trigger the investment vehicles representing the different asset classes 24 in an account belonging to an investor 18 to be disposed of and acquired in order to maintain the asset allocation(s) 26, 28, 30, 32, and 34 provided by the investment program 10. In other words, the program will generally be rebalanced using rebalancing services 92 on a regular basis, in accordance with the procedures established or approved by the Independent Expert 38.

All of the implementations and changes will be based on the indicative data included in indicative database 44 that is inputted at 54 into the computer program resident on the computer 82 and then processed by that computer program, which was designed and/or approved, implemented and monitored by the Independent Expert 38. As noted above, in yet another innovative aspect of the disclosed investment program 10, the Independent Expert 38 will be generally independent from other parties who receive variable fees and/or profits based on the amount of assets invested, or the discretionary allocations 26, 28, 30, 32, and 34 implemented during the accumulation and disbursement modes, or the non-discretionary allocations 26, 28, 30, 32, 34, and 36 recommended by the computer program resident on the computer 82 during the disbursement mode 16 in accordance with the procedures established or approved by the Independent Expert 38.

Similar or identical mechanisms, such as, for example, the computer program designed and/or approved, implemented and monitored by the Independent Expert 38, are used to address the conflicts of interest that can occur when determining how to establish a spending program that assists individual plan participants (i.e., an investor) 18 to minimize taxes, to the extent practical to achieve security for their income through retirement and manage their investment and mortality risk during the disbursement mode 16 (e.g., after employment). At retirement, each investor 18 should optimally develop income strategies potentially using a variety of products (including annuities and other disbursement mechanisms 36) with their wealth accumulated during the accumulation mode 14 to reach target horizons to minimize the chances of outliving their accumulated wealth and/or to achieve additional objectives.

As is known, licensed securities brokers, or other persons who typically provide assistance with these decisions, receive commissions when annuities and other disbursement mechanisms 36 are sold and, therefore, have or may have interests that could affect the quality of the assistance that they provide and may be adverse to the investor's 18 interest. Licensed securities brokers, or other persons who manage investments for an investor 18, and are compensated based on factors that may not be consistent with the interest of an investor 18, could have an interest in recommending or implementing inappropriate investment and/or disbursement strategies in order to maximize the licensed securities brokers' income rather than maximizing the investor's 18 income.

In the disbursement mode 16, the representative systems and methods contained in the representative investment program 10 assists the investor 18 to develop appropriate income strategies to reach target horizons with wealth levels pursuant to procedures and/or mechanisms determined or approved by the Independent Expert 38 on an ongoing basis. The program's 10 disbursement services at 94 may include, but are not limited to, combinations such as, for example, annuitization and other mechanisms 36; such as spend down; IRA rollovers; installment payments; and withdrawing a fixed amount or fixed percentage. The disbursement services 94 provided as a component of the present investment program 10 will also assist the investor 18 to establish appropriate asset allocations 26, 28, 30, 32, and 34, which may vary and change for different accounts and as investors' age, as determined or approved by the Independent Expert 38. The disbursement services 94 may also assist the investor 18 to alter the account sequence of portfolio withdrawals with a drawdown sequence to help maximize after-tax cash flow and/or wealth preservation. As an operating component of the present investment program 10, these services 94 can be provided on an automatic (discretionary basis) or an advisory basis (non-discretionary) or on a combination of both, as determined or approved by the Independent Expert 38.

In accordance with the implementation of the present investment program 10, all of the implementations, recommendations and changes will be based on the indicative data included in the indicative database 44 that is inputted into the computer 82 and processed by the computer program 146 designed and/or monitored and/or approved by the Independent Expert 38. As noted above, the Independent Expert 38 will be generally or totally independent from all other parties, who receive variable fees and/or profits based on the amount of assets invested, or the discretionary alternatives implemented, or the non-discretionary alternatives recommended by the investment program 10. The indicative data included in the indicative database 44 is processed by the computer program 146 resident on the computer 82. The program resident on the computer 82 then implements (in the case of a discretionary service) or advises the investor 18, through a facilitator 80 or otherwise as to the specific steps that should be taken, and implements the instructions of the investor 18. In this regard, the investment program 10 may suggest a course of action that will be implemented unless the investor opts out at 42.

The program services 12, 14, and 16 are coordinated on a continuing basis and are specifically tailored to each investor's 18 individual circumstances and short-term, intermediate-term and long-term funding needs, including retirement finding needs. The systems and methods utilized in the present investment program 10 are particularly valuable because they provide each investor 18 with much needed asset allocation services 14, 16 and while possibly formulating, and in all cases taking into account the investor's savings 12, including the present value of all current and future savings (including social security benefits and benefits under other pension plans) so that each investor 18 will, once the investment program 10 is implemented, maintain a disciplined investment policy while being responsive to the best interests of each investor 18. Moreover, the investments will generally be professionally initially allocated at 50, rebalanced at 92, reallocated at 90, and disbursed at 94 pursuant to criteria established or approved by an Independent Expert 38, generally with the on-going assistance of an assigned facilitator 80 to exploit opportunities in all types of market conditions in a manner that a typical investor 18 would not or could not exploit on their own without competent, conflict-free assistance.

The system and methods of the present investment program 10 are user-friendly in that the investment program 10 is specifically designed to eliminate the confusion typically suffered by an investor 18 by minimizing the investor's 18 input and decision points concerning savings 12, asset allocation 14, and disbursement 16 of assets after employment and/or during retirement. The result of utilizing the present investment program 10 is that appropriate savings, allocation, and disbursement are easier for the typical investor 18 and therefore more likely to occur, which, in the case of certain types of Benefit Plans, may assist plan sponsors to fulfill the primary purpose of such Benefit Plans, which is to provide income after termination of employment for eligible employees.

Yet another innovative feature of the present investment program 10 includes the elimination for the necessity of establishing, as is common practice, lifecycle trusts or even separate modeled portfolios. In fact, an appropriate allocation developed and maintained for an investor 18 can be precisely calculated to the need of and therefore unique to the investor 18, with fees for allocation services obtained by selling interest 56, 58, 60, 62, 64, 66, 68, 70, 72, and 74 in the vehicles, or from the investor 18 or from a third party 20 representing the investor, by utilization of at least some of the components of the present investment program 10.

Utilization of the present investment program 10 further refines the allocation process, enabling the allocation process, or the process of allocating assets in one or more asset classes, generally utilizing investment vehicles to be more precise by further separating the allocation process from the investment vehicles. As is known and currently believed conventional, the sponsors of the investment vehicles 24 pay for many services out of the money management fees that are charged to the plan sponsor. Referring also to FIG. 4, this process separates the investor 18 and/or sponsor for a plan 100, 102, and 104 from any dependence on making satisfactory arrangements with the sponsor(s) of the investment vehicle(s) 24.

One aspect of the investment program 10, which is described in the present disclosure, is the Independent Expert 38 that constructs or approves, among other things, appropriate asset allocation 26, 28, 30, 32, and 34, and annuities and other disbursement mechanisms 36. The Independent Expert 38 is generally or totally independent from other persons, such as, for example, persons who manage investment vehicles 24 associated with the investment program 10 who may benefit from investments made under the investment program 10.

As presently envisioned, the formulation or approval of asset allocations 26, 28, 30, 32, and 34, and annuities and other disbursement mechanisms 36 by the Independent Expert 38 may include, but is not intended to be limited to, algorithms, studies, analytics, research, models, papers and other work product or relevant materials provided by others, including the program operator 22. The program operator 22 is the person who operates the investment program 10. It is anticipated that persons who manage investment vehicles will have the most incentive to become a program operator 22 because operating an investment program 10 will generally lead to continuing, and profitable, relationships with an investor 18 assisted under the investment program 10. Furthermore, the Independent Expert 38, in its sole and absolute discretion, may seek the assistance of others in formulating or approving the asset allocation(s) 26, 28, 30, 32, and 34, and annuities and other disbursement mechanisms 36.

However, in all cases, the Independent Expert 38 retains the ultimate control and discretion with respect to the development and maintenance of the asset allocations 26, 28, 30, 32, and 34, and annuities and other disbursement mechanisms 36. The asset allocation(s) 26, 28, 30, 32, and 34, and annuities and other disbursement mechanisms 36, as expressed in a computer program resident on the computer 82, when implemented will not be static, but rather only the Independent Expert 38 in the Independent Expert's 38 sole and absolute professional discretion (including the ability to approve) may make or approve adjustments to the asset allocation(s) formulae, taking into consideration the investor's 18 investment goals and savings programs that the asset allocation(s) represent, and to account for changes in the economy and market conditions. Thus, the combinations will employ, for the benefit of at least one investor 18, concepts based on funding needs, including the present value of all savings (present and future), and the influence by other persons who may have interest that differ from that of the investor 18 will be strictly limited in a manner that eliminates or ameliorates any conflict of interest. For example, the compensation that such persons can pay to the Independent Expert 38 may be limited (e.g., to not more than 5% of the Independent Expert's 38 annual total income or revenues) and/or by limiting the ownership interests that person(s) can have in the Independent Expert 38.

The information furnished, including information provided by the investor 18, is possibly one key to providing impartial asset allocation services 14, 16 and/or savings plan services 12 for the investor 18. Thus, by incorporating an objective process in to the present investment program 10, the inherent conflict of interest, which can result from the way fees are traditionally paid in conventional investment vehicles, is effectively ameliorated or eliminated.

Specifically, as is well known, under conventional investment programs, by implementing or recommending a more aggressive allocation, the typical money manager, such as, for example, a mutual fund manager (as well as intermediaries such as licensed securities brokers), would receive higher fees and net profits, because equity weighted mutual finds typically pay their managers as well as intermediaries more than bond weighted mutual funds or other lower risk funds.

As shown in FIG. 4, a system monitor 96, completely independent of person(s) who receives variable fees and profits, may be responsible for monitoring the investment program 10, which preferably includes a computer program 146 designed or approved, implemented and monitored by the Independent Expert 38, to insure that safeguards designed to ameliorate the conflicts of interest are kept in place and complied with at all times. The computer program 146, and/or the system monitor 96, may, in addition, be monitored and/or certified by third parties (e.g., an accounting firm), having no financial interest in the specific investments being made in the sponsors plan for an investor 18 to ensure that the conditions safeguarding against conflict(s) of interest are in place and have been adhered to.

Under the present investment program 10, which includes the systems and methods described in the present disclosure, there may be a separate fee paid for asset allocation services 14, 16 and/or savings plan services 12, which may be limited to an annual asset based fee (e.g., up to 100 basis points) and reimbursable expenses (in the case of Benefit Plans which invest "direct expenses") which may be similarly limited to a percentage of the total amount invested (e.g., up to 25 basis points). In the alternative, the program operator 22 may charge only the fees from the investment vehicles 24 or investments in which an investor's 18 assets are placed.

Figure 3:
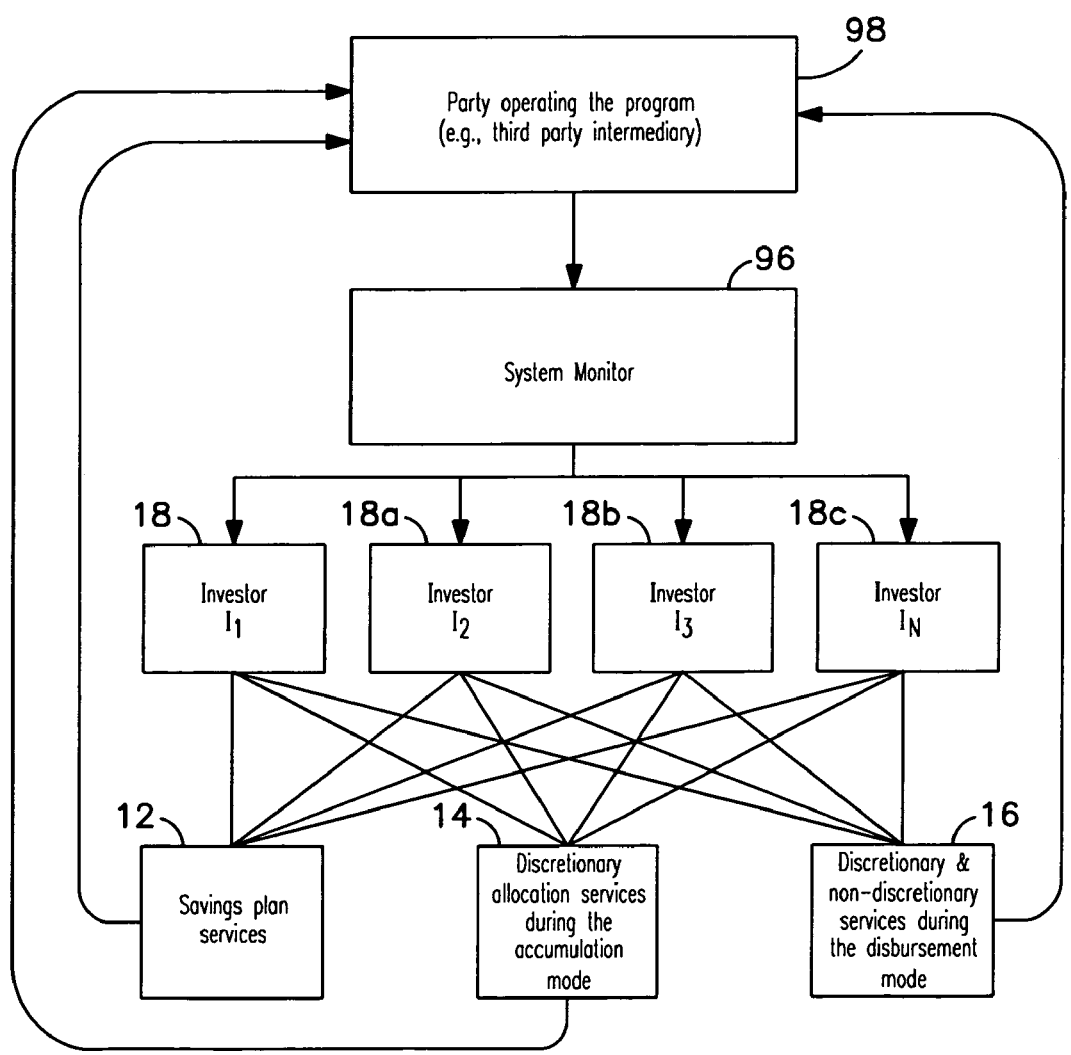
FIG. 3 is a representative diagram illustrating one representative investment allocation and management system of the present disclosure as seen by each investor including individual plan participants.

FIG. 3 is a schematic representation of the investment program 10 structure as seen by each of a plurality of investors 18, 18a, 18b, and 18c. As illustrated, the party 98 operating the investment program 10 (e.g., financial services company, financial intermediary 144, etc.) communicates with a system monitor at 96 that controls the computer 82 having the computer program resident thereon which in turn communicates with each investor 18, 18a, 18b, and 18c electronically or other conventional means, as is known in the art.

The computer based system monitor 96 collects data from each underlying service, including, where utilized, services 12, 14, and 16 and can keep track of each investor's account. The computer based system monitor also collects data and transaction instructions from the program operator 98 and carries out transactions changing the allocation(s), saving plans, and/or distribution mechanisms of an investor's 18, 18a, 18b, and 18c account upon any change in the indicative data included in indicative database 44, which may occur from the passage of time (aging of the investor) or due to new data provided by the investor contact 86 or through the facilitator 80. Additionally, the system monitor 96 aggregates and nets the transactions between the investment allocations 26, 28, 30, 32, and 34, and annuities and other disbursement mechanisms 36 and their underlying investment vehicles 24.

The underlying investment vehicle(s) may simply deduct investment advisor fees from the vehicles 56, 58, 60, 62, 64, 66, 68, 70, 72, and 74 (by selling interests in it or otherwise) and provides such data to the system monitor 96. These fees are presently anticipated to be in the form of an hourly fee, a per capita fee, or an asset based fee or any combination of the foregoing fees may be set by the program operator based on existing market conditions.

As shown in FIG. 4, the system monitor 96 gathers and processes indicative data included in indicative database 44 from the investor 18 accounts in the savings plan 12; the investment vehicles and asset classes 24 used to implement the discretionary allocation(s) 26, 28, 30, 32, and 34 during the accumulation mode 14; the discretionary and non-discretionary services (including annuities and other disbursement mechanisms 36) during the disbursement mode 16; and, in the case of Benefit Plans, aggregates the accounts by separate and distinct Benefit Plans 100, 102, and 104. In the case of Benefit Plans, the total individual plan participant account in investment vehicles within that Benefit Plan, the system monitor 96 may calculate and report to each Benefit Plan trustee, plan sponsor, or third parties as appropriate the total individual plan participant account assets in each investment vehicle used to implement the discretionary and non-discretionary allocation. Transactions may be "netted" and aggregated within each Benefit Plan 100, 102, and 104 and the system monitor 96 may "net" and aggregate transactions across some or all Benefit Plans when required.

The system monitor 96 also may calculate and may report the expenses associated with the investment program 10 for each investor account 18, 18*a*, 18*b*, and 18*c* and, in aggregate, for each Benefit Plan 100, 102, and 104. The system monitor 96 may debit each investor account 18, 18*a*, 18*b*, and 18*c* for any expenses associated with the investment program 10 due or reflects the reduced value of interests in the vehicle(s) in the investor accounts 18, 18*a*, 18*b*, and 18*c*. The system monitor 96 calculates and reports any expenses associated with the investment program 10 paid by each individual plan participant account in the investment vehicles, by each investor 18, 18*a*, 18*b*, and 18*c* and by each Benefit Plan 100, 102, and 104.

The program 10 and the system monitor 96 (see FIG. 4) generally insulate any person (such as, e.g., an investment vehicle manager 142 or a financial 144) who receives variable fees and profits, depending on the services 12, 14, and 16 provided from the Independent Expert 38 and its fees, and the facilitators, and their compensation by maintaining separate systems of compensation that is memorialized in the system monitor. This insulation and separation removes or substantially reduces any economic or profit incentive on the part of persons who are in a position to actually affect individual plan participants or Investor 18 decisions or to direct an investor 18 to invest in a manner that generates higher fees and/or profits that may be inappropriate for the investor 18 but more profitable to persons who receive variable fees and profits, depending on the allocation (including whether or not an annuity is selected) or the amount of the finds invested such as a typical money manager. The computer program utilized by the system monitor, in its initial form, will be initially designed and constantly updated to follow and adhere to the safeguards and conditions designed to mitigate or eliminate overreaching by person(s) who receives variable fees and profits, depending on the allocation (including whether or not an annuity is selected) or the amount of the funds invested, including, where appropriate those contained or implicit in ERISA, as well as other regulatory constraints and requirements.

This insulation and separation removes or substantially reduces any economic or profit incentive on the part of persons who are in a position to actually affect individual plan participants or Investor 18 decisions or to direct an investor 18 to invest in a manner that generates higher fees and/or profits that may be inappropriate for the individual plan participant or Investor 18 but more profitable to persons who receive variable fees and profits, depending on the allocation (including whether or not an annuity is selected) or the amount of the funds invested such as a typical money manager. The computer program utilized by the system monitor, in its initial form, will be initially designed and constantly updated to follow and adhere to the safeguards and conditions designed to mitigate or eliminate overreaching by person(s) who receives variable fees and profits, depending on the allocation (including whether or not an annuity is selected) or the amount of the funds invested, including, where appropriate those contained or implicit in ERISA, as well as other regulatory constraints and requirements.

Figure 5:
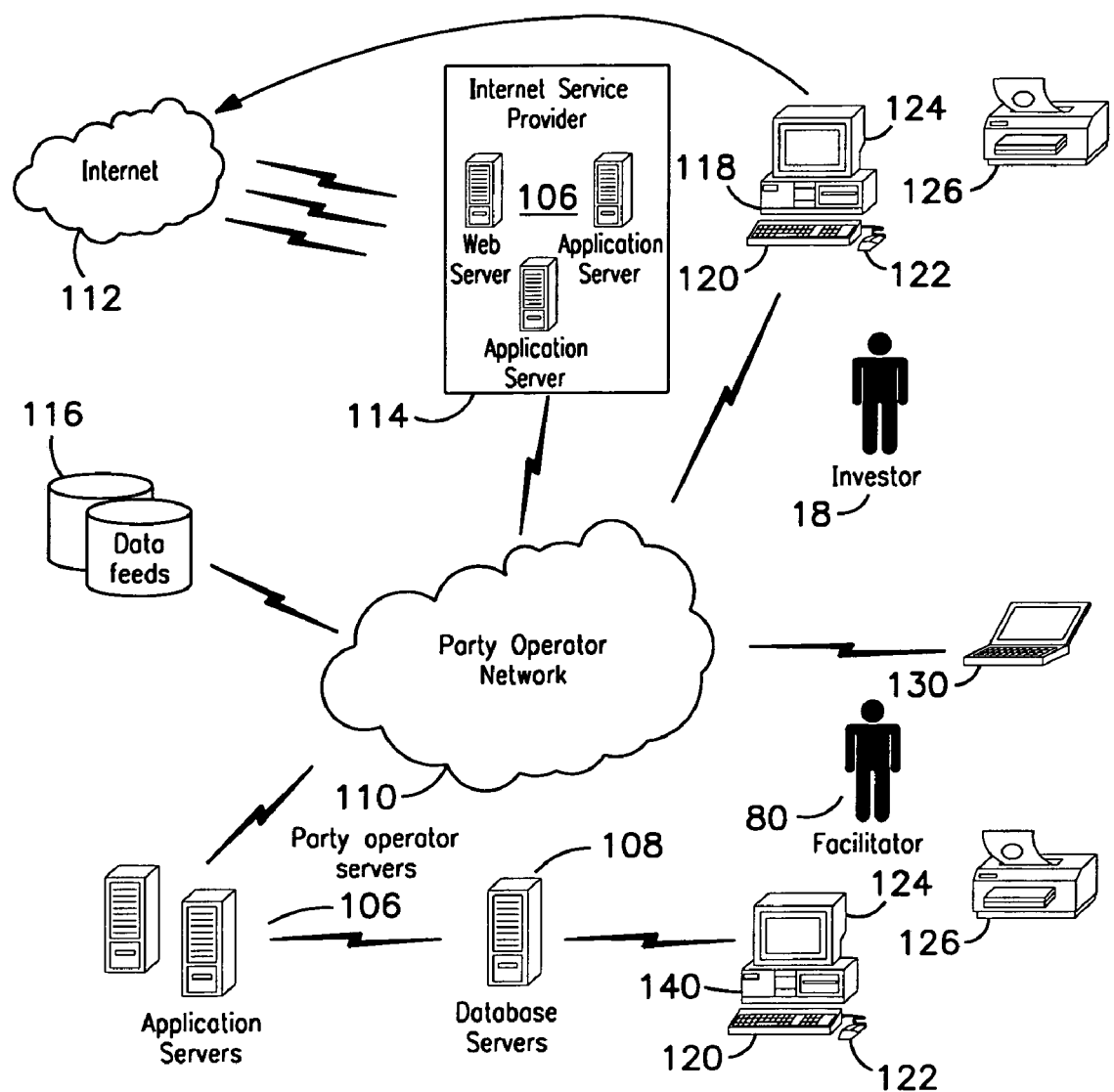
FIG. 5 is a representative schematic diagram of representative computer hardware useful with the representative investment services of the present disclosure.

As illustrated in FIG. 5, the investment allocation portion of the investment program 10, which includes the systems and methods of the present disclosure, may require certain computer hardware, including but not limited to, a mainframe computer or server(s) 106 for processing large volumes of data stored in a data storage unit 108 and a communications system, including, but not limited to, intranet, Internet 112, and other communication vehicles, as is known to those skilled in the art. The stored data is taken from data provided by the investor 18 or third parties, as described above. A personal computer or workstation 118 having a hard drive or other storage device, an input device such as a keyboard 120 and mouse 122, and an output device such as a display 124 and printer 126 are operatively connected to the computer 118, as is known to those skilled in the art. The program operator's 22 computer 140 may be used to communicate with and monitor the investor's 18 computer 118, as is known to those skilled in the art. For example, the program operator's computer 140 may be networked together with a laptop computer 130 controlled by the facilitator 80 and the investor's computer 118 in a party operator network 110, which provides a gateway to the Internet 112 via Internet service provider 114. Data feeds 116 may also be networked into the party operator network 110. In particular, computer programs used to implement asset allocation services 50, 90, and 92 and the programs used to implement the savings services 12 loaded on the application servers 106 are accessed by, or on behalf of, the program operator 22 and used to transmit under the investment program 10 in a tangible form, to each investor 18, including participants in Benefit Plans, as is known to those skilled in the art.

The present investment program 10 includes a unique data processing system that, among other things, automatically enrolls new employees and non-participating employees in Benefit plans (e.g., 401(k), 403(b), 457), and otherwise and moves individuals into appropriate contribution rates and appropriate investment allocations over time, unless the individual plan participant (where applicable) opts out of the savings plan, the contribution method, or the allocation method. In doing so, the present program is successful in turning the win/lose proposition normally associated with automatic enrollment into a win/win proposition for all the interested constituencies, especially the plan participants.

The present investment program 10 also enables the automation of the process of selecting investment vehicles. By reducing the steps in the investment vehicle selection process (how much is up to the client) the investment vehicle selection process becomes more cost effective, efficient, and assists all persons involved in complying with applicable laws and regulations.

The present investment program 10 uniquely serves the interests of each investor 18 including plan participants, as well as employers 150 (see FIG. 4) who sponsor Benefit Plans. An investor 18 will benefit by taking what is otherwise a complex set of decisions and reducing them to an automatic procedure, which, if simply adhered to, is believed to materially increase each investor's probable return, including their probable retirement income. The present investment program 10 will also benefit plan sponsors in that the investment program 10 will reduce their risk of liability by allocating assets in each plan participant's account based on: 1) the information available about each plan participant; 2) pursuant to prudent procedures; and 3) based on the formulae developed or approved and implemented in various computer programs, by a respected Independent Financial Expert, whose qualifications may have been reviewed by the United States Department of Labor (the "Department").

The results derived from the implementation of the investment program 10 are believed clearly superior to the one size fits all approach normally used in automatic enrollment procedures, and the emphasis on investment vehicles, and their recent performance, currently used in the marketplace. It is also believed that the investment program 10, particularly if coupled with a finding by the Department that the procedures are permitted under ERISA, will materially reduce the risk of plan sponsors who decide to use any of the mechanisms outlined above, including "negative election" mechanisms outlined above. Further, the results derived from the implementation of the investment program 10 are believed to permit the money managers (and other financial intermediaries) to control their clients by providing the most important services relative to achieving financial goals without engaging in transactions that could be considered prohibited self dealing under ERISA.

Another aspect of the present investment program 10 arises from placing investment vehicles in their proper perspective. Selection of a limited universe of investment alternatives in an employer-sponsored participant directed account plan is typically the responsibility of the sponsoring employer (who acts as a fiduciary when selecting or monitoring such alternatives). The fiduciaries, including the plan sponsor may then be provided fiduciary relief under section 404(c) of ERISA for the allocation decisions when a participant makes an affirmative election to invest from among the vehicles. If a vehicle becomes inappropriate, and needs to be replaced, there is no affirmative election with regard to the replacement vehicle. This could cause the relief that is otherwise available to become unavailable due to the absence of any affirmative election. An element of the present investment program 10, by placing investment alternatives in their proper perspective, addresses this problem. Instead of electing an investment in a particular vehicle, participants can elect in an alternative that are instead described more generically (e.g., the mixture of asset classes designed for the participant's circumstances). This investment alternative enables the fiduciary (in the case of a benefit plan) to change investment vehicles without obtaining an additional affirmative election from individual plan participants, while continuing to enjoy relief for an Individual plan participant's asset allocation decisions.

By placing investment vehicles in their proper perspective, it is also believed that an investor 18, or a third party acting on behalf of an investor 20, will be better enabled to make a single election regarding the allocation of a particular investor's assets because it is believed that the vehicles can be changed by the decision of a third party acting on behalf of an investor, up to and including through retirement. If there is no plan fiduciary that makes the decision, this decision can be made or approved by another independent person such as the Independent Expert 38.

In the alternative, the initial positive election can include a formulaic method (e.g., select the investment vehicle(s) 24 with the lowest fees that can accomplish the objective of the Investment Program 10, from those available under the Investment Program 10 for selecting alternative vehicles or circumscribing the discretion of the persons who select the investment vehicles. For example, when a participant elects to receive a rollover distribution of his or her retirement benefits from an employer-sponsored 401(k) plan, the investment vehicles in a plan may no longer be available. At that point in time, the present investment program 10 permits the assets in the disbursement mode to be allocated (and ultimately distributed) automatically in replacement vehicles, such an IRA or other account, which IRA and vehicles are selected on a basis that was disclosed and agreed to, by the individual plan participant or a person acting on behalf of the investor, at the time of the initial election, or at any subsequent time. This enables a financial institution or other financial intermediaries to retain their relationships with their clients on the basis of providing value-added services in a manner that addresses possible conflicts of interest, and for investors to continue receiving such value-added services up to and through retirement while minimizing or eliminating additional involvement and/or decisions by the individual plan participant.

Changes and modifications in the specifically described representative embodiments can be carried out without departing from the scope of the disclosure which is intended to be limited only by the scope of the appended claims.

What is claimed is:

1. A system for providing a discretionary asset allocation program for at least one investor, the discretionary asset allocation program provided by (i) at least one conflicted person who receives variable fees or profits for providing services related to the discretionary asset allocation program, or (ii) the at least one conflicted person in concert with at least one person who is substantially independent of the at least one conflicted person, said system comprising:

at least one discretionary asset allocation program for the at least one investor;

data storage means for storing data for the at least one investor;

means, operatively connected to the data storage means, for automatically implementing discretionary investment allocation decisions utilizing the discretionary asset allocation program, wherein the discretionary investment allocation decisions are automatically implemented using process that reduces or eliminates the at least one conflicted person's ability to self deal, and wherein the discretionary investment allocation decisions are implemented, developed, or maintained by the at least one substantiallay independent person;

a computer having a program, operatively connected to said means for automatically implementing discretionary investment allocation decisions, to implement the discretionary investment allocation decisions implemented, developed, or maintained by the at least one substantially independent person; and means, operatively connected to said means for automatically implementing discretionary investment allocation decisions, for eliminating or at least ameliorating possible economic conflict of interest by separating or appropriately combining, the determination of how much to save and how to allocate investment assets from other fee generating functions.

2. The system of claim 1, further comprising software created by computer programmers who have no affiliation with the at least one conflicted person who may receive variable fees or profits under the program by reason of asset allocation.

3. The system of claim 1 further comprising, in the event an investor should opt out of the discretionary asset allocation program, means for processing the data from each investor that has opted out of the discretionary asset allocation services such that a tangible recommendation as to asset allocation is generated and sent to each investor that opted out of the discretionary asset allocation services.

4. The system of claim 3 further comprising means for correlating retirement needs and life cycle stage with an appropriate asset allocation.

5. The system of claim 3 further comprising means for determining a discretionary asset allocation based on a minimum data requirement as determined or approved by the at least one independent person.

6. The system of claim 3 wherein the discretionary asset allocation program further comprises means for automatically rebalancing the discretionary asset allocation based on data received from the at least one investor, at least one third party, or a facilitator on a regular basis as determined or approved by an independent expert.

7. The system of claim 3 wherein the discretionary asset allocation program further comprises means for automatically reallocating discretionary asset allocation based on data received from the at least one investor, a third party, or a facilitator, on at least one occasion as determined or approved by an independent expert.

8. The system of claim 3 wherein the discretionary asset allocation program further comprises means for automatically allocating, rebalancing, and reallocating investment assets based on data from a plurality of sources, as designed or approved by an independent expert.

9. The system of claim 1 wherein the at least one independent person determines or approves the discretionary asset allocation and savings rate and receives fees independent from the fees charged for investment management.

10. The system of claim 1 wherein the at least one independent person is substantially independent from and unrelated to any other person who receives compensation in connection with transactions related to the savings program.

11. The system of claim 1 further comprising means for assuring that the investment manager is unaware of the investments of any one investor, but sees only the aggregate investments of an entire plan.

12. The system of claim 1, wherein the at least one independent person determines or approves the basis for discretionary asset allocation.

13. The system of claim 12, wherein the at least one independent person is substantially independent from and unrelated to any other person who (1) receives compensation in connection with discretionary asset allocation or (2) receives compensation in connection with asset management.

14. The system of claim 1, further comprising means for assuring that the asset management is performed by one or more persons who are unaware of any individual account allocations but instead see only the aggregate of the assets to be managed.

15. The system of claim 1, wherein the assets are reallocated on a regular basis.

16. The system of claim 1, further comprising asset classes that include varying proportions of shares or other interests in a plurality of investments.

17. The system of claim 16, wherein the plurality of investments include collective investment vehicles.

18. The system of claim 1, further comprising means for generating a tangible report recommending or directly establishing a savings program for the at least one investor.

* * * * *